United States Patent
Hansen et al.

(10) Patent No.: US 9,067,824 B1
(45) Date of Patent: Jun. 30, 2015

(54) MODIFICATION OF POZZOLANIC CHEMISTRY THROUGH BLENDING

(75) Inventors: Andrew S. Hansen, Bountiful, UT (US); John M. Guynn, Salt Lake City, UT (US)

(73) Assignee: ROMAN CEMENT, LLC, Salt Lake City, UT (US)

(*) Notice: Subject to any disclaimer, the term of this patent is extended or adjusted under 35 U.S.C. 154(b) by 113 days.

(21) Appl. No.: 13/030,123

(22) Filed: Feb. 17, 2011

Related U.S. Application Data

(60) Provisional application No. 61/305,423, filed on Feb. 17, 2010, provisional application No. 61/324,741, filed on Apr. 15, 2010, provisional application No. 61/429,138, filed on Jan. 2, 2011.

(51) Int. Cl.

| | |
|---|---|
| *G01N 31/00* | (2006.01) |
| *G06F 19/00* | (2011.01) |
| *C04B 14/00* | (2006.01) |
| *C04B 18/06* | (2006.01) |
| *C04B 14/40* | (2006.01) |
| *C04B 5/00* | (2006.01) |
| *C04B 7/14* | (2006.01) |
| *C04B 28/08* | (2006.01) |
| *C04B 7/12* | (2006.01) |
| *C04B 7/26* | (2006.01) |
| *C04B 7/153* | (2006.01) |

(52) U.S. Cl.
CPC ... *C04B 7/12* (2013.01); *C04B 7/26* (2013.01); *C04B 7/153* (2013.01)

(58) Field of Classification Search
CPC .... C04B 18/08; C04B 14/28; C04B 40/0028; C04B 40/0039; C04B 2111/00206; G01N 31/00; G01N 23/00; G01N 15/02
USPC ............... 700/265; 73/32 R; 106/705; 702/29
See application file for complete search history.

(56) References Cited

U.S. PATENT DOCUMENTS 6,277,189 B1 * 8/2001 Chugh .......................... 106/705
(Continued)

FOREIGN PATENT DOCUMENTS

| KR | 1019840001611 | 9/1984 |
|---|---|---|
| WO | WO9217415 | 10/1992 |

(Continued)

OTHER PUBLICATIONS

"Fly Ash Facts for Highway Engineers". U.S. Department of Transportation. Nov. 28, 2006 [Retrieved on Mar. 20, 2013] http://web.archive.org/web/20061128011000/http://www.fhwa.dot.gov/Pavement/recycling/fach03.cfm.*

Stutzman, Paul E.; Centeno, Lilia. Compositional Analysis of Beneficiated Fly Ashes. National Institute of Standards and Technology. May 1995. Retrieved from http://fire.nist.gov/bfrlpubs/build95/PDF/b95010.pdf.*

(Continued)

*Primary Examiner* — Kaj K Olsen
*Assistant Examiner* — Karam Hijji
(74) *Attorney, Agent, or Firm* — Workman Nydegger

(57) ABSTRACT

The present disclosure relates to methods for controlling the chemical composition of a first pozzolan by blending it with a different pozzolan having a different chemical composition. The method includes intimately mixing the two pozzolans and using a chemical analyzer to determine a chemical characteristic of the pozzolan fraction being produced. The output from the chemical analyzer is then used to control the blending of the first and second outputs to maintain the chemical characteristic within a desired range.

20 Claims, 3 Drawing Sheets

(56) References Cited

U.S. PATENT DOCUMENTS

| | | | |
|---|---|---|---|
| 2004/0035330 A1 | 2/2004 | Oates et al. | |
| 2004/0089202 A1* | 5/2004 | Ronin | 106/709 |
| 2005/0132933 A1* | 6/2005 | Blum | 106/739 |
| 2007/0265783 A1* | 11/2007 | Mound | 702/8 |
| 2008/0178770 A1* | 7/2008 | Schumacher et al. | 106/708 |
| 2010/0011995 A1* | 1/2010 | Nakamura et al. | 106/705 |
| 2011/0067601 A1 | 3/2011 | Fried | |

FOREIGN PATENT DOCUMENTS

| | | |
|---|---|---|
| WO | WO9746717 | 12/1997 |
| WO | WO 2008069115 A1 * | 6/2008 |

OTHER PUBLICATIONS

Grzeszrezyk, Stefania; Lipowski, Grzegorz. Effect of Content and Particle Size Distribution of High Calcium Fly Ash on the Rheological Properties of Cement Pastes. Cement and Concrete Research. vol. 27, No. 6, pp. 907-916. 1997 Retrieved from ftp://ftp.ecn.purdue.edu/olek/PTanikela/To%20Prof.%20Olek/Data/sedimentation/fly%20ash%20particle%20size%2.*

Lee, Seung Heun; Kim, Hong Joo; Sakai, Etsuo; Daimon, Masaki. Effect of particle size distribution of fly ash-cement system on the fluidity of cement pastes. Cement and Concrete Research. vol. 33, pp. 763-768. 2003. Retrieved from http://ac.els-cdn.com/S0008884602010542/1-s2.0-S0008884602010542-main.pdf?_tid=165feac6-8d1b-11e3-8677-00000aacb35e&acd.*

* cited by examiner

US 9,067,824 B1

MODIFICATION OF POZZOLANIC CHEMISTRY THROUGH BLENDING

CROSS REFERENCE TO RELATED APPLICATIONS

This Application claims the benefit of U.S. Provisional Patent Application Ser. Nos. 61/305,423, filed Feb. 17, 2010; 61/324,741, filed Apr. 15, 2010, and 61/429,138, filed Jan. 2, 2011, all of which are hereby incorporated herein by reference in their entirety.

BACKGROUND OF THE INVENTION

1. Field of the Invention

The invention is generally in the field of pozzolans used with hydraulic cement to manufacture concrete.

2. Relevant Technology

In modern concrete, pozzolans such as fly ash and volcanic ash are often used to replace a portion of Portland cement. Replacing a portion of Portland cement with pozzolan yields improved concrete with higher durability, lower chloride permeability, reduced creep, increased resistance to chemical attack, lower cost, and reduced environmental impact. Pozzolans react with excess calcium hydroxide released during hydration of Portland cement and therefore help prevent carbonation. However, there is a limit to how much Portland cement can be replaced with pozzolan because pozzolans generally retard strength development.

BRIEF SUMMARY

The present disclosure relates to methods for controlling the chemical composition of a first pozzolan by blending it with a different pozzolan having a different chemical composition. The method includes intimately mixing the two pozzolans and using a chemical analyzer to determine a chemical characteristic of the pozzolan fraction being produced. The output from the chemical analyzer is then used to control the blending of the first and second outputs to maintain the chemical characteristic within a desired range.

In one embodiment, a method includes one or more of the following steps: (i) providing a first pozzolan with a first chemical composition; (ii) providing a second pozzolan having a second chemical composition that differs from the first chemical composition in at least one chemical characteristic; (iii) blending the first pozzolan with the second pozzolan to produce a pozzolan fraction suitable for use with a Portland cement fraction, where the first pozzolan and the second pozzolan are intimately blended together and stored in a storage container; (iv) where the blending produces a pozzolan fraction having a desired chemical composition for the at least one chemical characteristic and the desired chemical composition is achieved at least in part by determining the chemical characteristic for the pozzolan fraction and controlling the blending of the first pozzolan and the second pozzolan to produce the pozzolan fraction having the chemical characteristic within a predetermined range.

In one embodiment, determining the chemical characteristic for the pozzolan fraction includes measuring the at least one chemical characteristics of the pozzolan fraction using a chemical analyzer to produce a series of readings for the at least one chemical characteristic. The method can further include (i) providing a control module configured to run computer executable instructions and receive an output from the chemical analyzer; and (ii) receiving the series of readings at the control module and calculating one or more blending parameters for blending the first and second pozzolans together to achieve the desired chemical composition.

The at least one chemical characteristic may include the calcium oxide content of the pozzolan fraction. Determining the calcium content can be highly advantageous since the calcium oxide content is known to have a substantial impact on the performance of cements and concretes incorporate the pozzolan fraction. For example, the calcium oxide content can have a substantial impact on early and late term strength, set times, sulfate resistance, heat of hydration and the like.

Alternatively, the at least one chemical characteristic that is determined includes the specific gravity. The specific gravity can be maintained within a desired range, wherein the predetermined range of the specific gravity is within 0.03, preferably 0.02, and most preferably 0.01.

The first and second pozzolans are preferably blended dry. Blending in the dry state allows intimate mixing before being mixed with water and aggregate to form concrete. Dry blending and storing (i.e., blending before use in concrete) is necessary to allow use of a chemical analyzer to produce the pozzolan fraction having the chemical characteristic within the desired range. This is in contrast to the industry practice of "blending in the truck". The present invention can produce quality control similar to that typically observed for cement products, which allows the pozzolan fraction to be blended with a Portland cement fraction and used in blended cements that meet the quality control expectations of 100% OPC.

In some embodiments, the first and second pozzolans are blended dry together and then blended with the Portland cement fraction. In other embodiments, the first and second pozzolans can be blended with the Portland cement fraction simultaneously. However, in this embodiment, blending the first and second pozzolans and the Portland cement fraction is performed prior to mixing with water and aggregate to form concrete. Since Portland cement is provided as a dry powder and its chemical composition is known, the detection of the chemical characteristics in the pozzolan fraction can be obtained even if the blend is a ternary blend.

In another embodiment, the first and second pozzolans are blended together and thereafter mixed simultaneously with a Portland cement fraction, water, and aggregate.

The methods also include controlling the chemical characteristics of constituents other than calcium oxide, such as, but not limited to aluminate content, tricalcium silicate content, dicalcium silicate content, calcium oxide content, gypsum content, or a combination or ratio of these.

DETAILED DESCRIPTION OF THE PREFERRED EMBODIMENTS

I. Introduction

Figure 1:
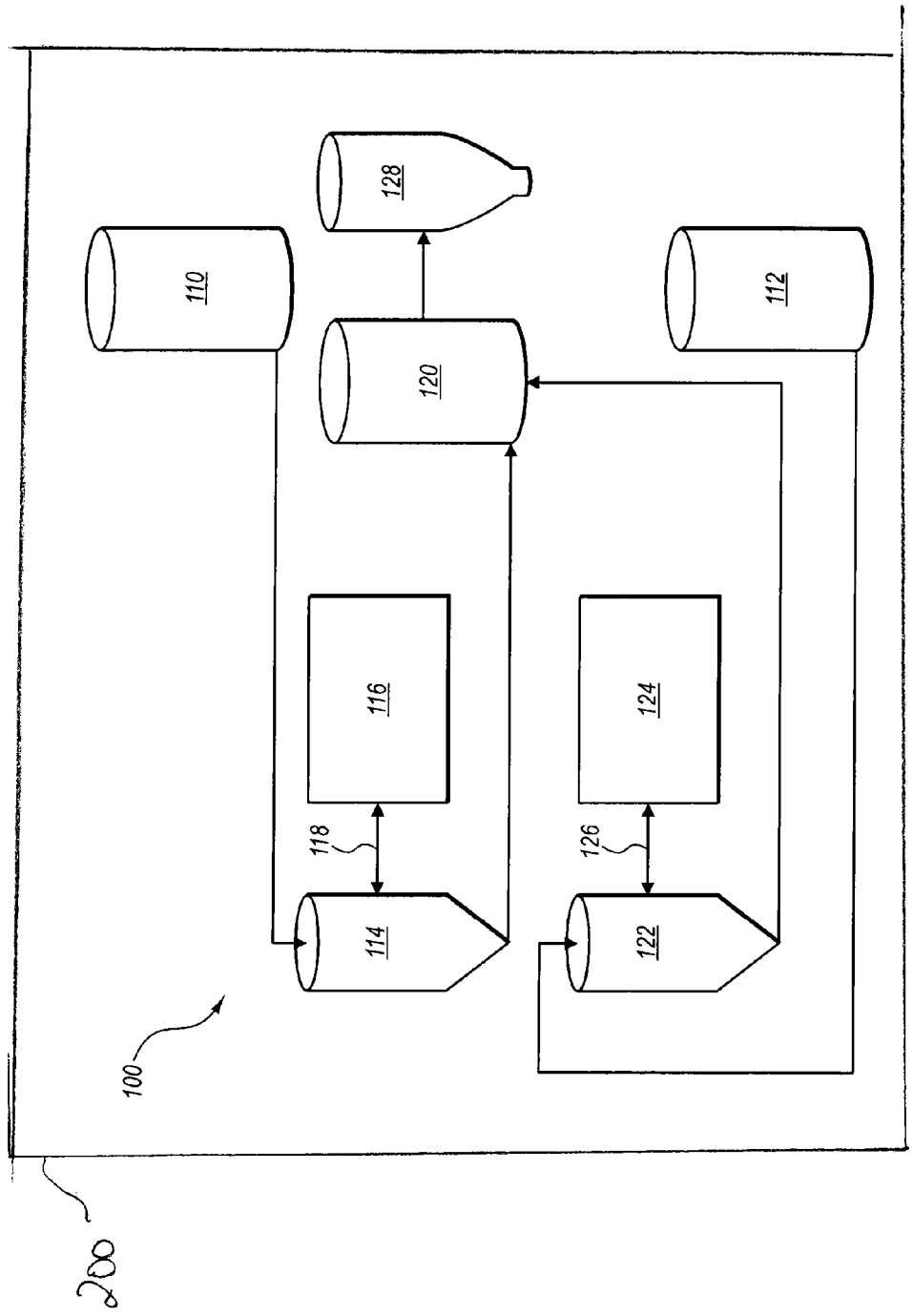
FIG. 1 is a schematic of a system for producing a pozzolan cement blend.

Disclosed herein are high early strength blended cements and methods for making the blended cements. The present invention also includes methods for making the hydraulic cement fraction and/or pozzolan fraction of the blended cement. The blended cements can take the place of ordinary Portland cement (e.g., Type I and II cements) used in both common and high end construction.

The inventive pozzolan cement blends include a unique distribution of pozzolan and hydraulic cement particles in which the larger sized particles comprise mostly or exclusively pozzolan and the smaller sized particles comprise mostly or exclusively hydraulic cement. The calcium hydroxide required to effect hydration of the pozzolan is provided by excess calcium from the hydraulic cement fraction. The result is a cement composition that provides high early strength similar to ordinary Portland cement ("OPC") with lower cost and $CO_2$ output.

The present invention unlocks much more of the binding ability of the hydraulic cement by utilizing the finer, more reactive particles that become substantially or fully hydrated in the short term (e.g., 7 days, 28 days or 45 days). Rapid hardening of the finer hydraulic cement particles is controlled and water demand is reduced by utilizing larger pozzolan particles that help disperse the hydraulic cement particles. In this way, the hydraulic cement and pozzolan fractions are put to their highest respective uses. This feature is referred to herein as "particle-size-optimized blended cement."

The present invention also relates to methods for producing the cement fraction of the blended cement. The methods include comminuting, classifying, and/or modifying the chemistry of the hydraulic cement fraction to have a desired particle size distribution, desired chemical composition, and/or a desired consistency in chemical properties and/or particle size.

The present invention also relates to methods for producing the pozzolan fraction of the blended cement. The methods include comminuting, classifying, and/or modifying the chemistry of the pozzolan fraction to have a desired particle size distribution, desired chemical composition, and/or a desired consistency in chemical properties and/or particle size. In one embodiment, the pozzolan fraction can be manufactured from an initial pozzolan stream that varies over time. The methods of the invention can be used to produce a pozzolan fraction having less variability in particle size and/or chemical properties compared to the initial pozzolan stream.

The methods for producing the pozzolan fraction and/or the hydraulic cement fraction can be performed using an online detector such as an online particle size analyzer and/or an online chemical analyzer. In one embodiment, the methods may further include a control module running computer executable instructions. The control module can be configured to receive a series of readings from the online detector and control one or more components of the hydraulic cement fraction manufacturing system and/or the pozzolan fraction manufacturing system to achieve a desired distribution of hydraulic cement particles and/or pozzolan particles and/or a desired chemical characteristic. In one embodiment, the control module can run a neural net that monitors the manufacture of the hydraulic cement fraction and/or the pozzolan fraction and adjusts settings of one or more components of the cement manufacturing system and/or the pozzolan manufacturing system to achieve a desired distribution of the hydraulic cement fraction and/or the pozzolan fraction.

The present invention also includes ternary blends of pozzolan and hydraulic cement. The ternary blends include a hydraulic cement fraction, a coarse pozzolan fraction, and a fine pozzolan fraction. The hydraulic cement fraction is sized between the coarse pozzolan fraction and the fine pozzolan fraction. For example, the particle size of the fine pozzolan fraction in one illustrative example can span 0.1-3 microns, the hydraulic cement fraction can span 2-20 microns, and the coarse pozzolan fraction can span 15-60 microns (where the top and bottom of the range are a d90 and d10 respectively).

Except as otherwise specified, percentages are to be understood in terms of weight percent. It will be appreciated, however, that where there is a significant disparity between the density of the hydraulic cement and that of the pozzolan, adjustments can be made so that an equivalent volume of pozzolan is added in place of a similar volume of hydraulic cement being replaced. For example, the correct weight of pozzolan replacement may be determined by multiplying the weight of cement reduction by the ratio of the pozzolan density to the cement density.

The particle size of perfectly spherical particles is measured by the diameter. While fly ash is generally spherical owing to how it is formed, Portland cement and pozzolan particles may be non spherical. Thus, the "particle size" shall be determined according to accepted methods for determining the particle size of ground or other otherwise non spherical materials, such as Portland cement and many pozzolans. The size of particles in a sample can be measured by visual estimation or by the use of a set of sieves. Particle size can be measured individually by optical or electron microscope analysis. The particle size distribution (PSD) can also be determined or estimated by laser and/or x-ray diffraction (XRD).

II. Components of the Blended Cements

A. Hydraulic Cement Fraction

"Portland cement" commonly refers to a ground particulate material that contains tricalcium silicate ("$C_3S$") ("alite"), dicalcium silicate ("$C_2S$") ("belite"), tricalcium aluminate ("$C_3A$") and tetracalcium aluminoferrite "($C_4AF$")" ("celite") in specified quantities established by standards such as ASTM C-150 and EN 197. The term "hydraulic cement", as used herein, shall refer to Portland cement and related hydraulically settable materials that contain one or more of the four clinker materials (i.e., $C_2S$, $C_3S$, $C_3A$ and $C_4AF$), including cement compositions which have a high content of tricalcium silicate, cements that are chemically similar or analogous to ordinary Portland cement, and cements that fall within ASTM specification C-150-00.

In general, hydraulic cements are materials that, when mixed with water and allowed to set, are resistant to degradation by water. The cement can be a Portland cement, modified Portland cement, or masonry cement. "Portland cement", as used in the trade, means a hydraulic cement produced by pulverizing cement clinker particles (or nodules), comprising hydraulic calcium silicates, calcium aluminates, and calcium aluminoferrites, and usually containing one or more forms of calcium sulfate as an interground addition. Portland cements are classified in ASTM C-150 as Type I II, III, IV, and V. Other hydraulically settable materials include ground granulated blast-furnace slag, hydraulic hydrated lime, white cement, calcium aluminate cement, silicate cement, phosphate cement, high-alumina cement, magnesium oxychloride cement, oil well cements (e.g., Type VI, VII and VIII), and combinations of these and other similar materials. In a preferred embodiment, the Portland cement has a chemical composition according to ASTM C-150 for Type I, II, III, or V cements, which tend to have beneficial properties for the ready mix industry.

Portland cement is typically manufactured by grinding cement clinker into fine powder. Various types of cement grinders are currently used to grind clinker. In a typical grinding process, the clinker is ground until a desired fineness is achieved. The cement is also typically classified to remove particles greater than about 45 µm in diameter, which are typically returned to the grinder for further grinding. Portland cements are typically ground to have a desired fineness and particle size distribution between 0.1-100 µm, preferably 0.1-45 µm. The generally accepted method for determining the "fineness" of a Portland cement powder is the "Blaine permeability test", which is performed by blowing air through an amount of cement powder and determining the air permeability of the cement. This gives an approximation of the total specific surface area of the cement particles and also a rough approximation of the particle size distribution, which is related to the specific surface area.

In contrast to OPC, the inventive blended pozzolan cement does not utilize a normal distribution of Portland cement particles but rather smaller particles and/or a narrower distribution. All or a substantial portion of the larger hydraulic cement particles are "replaced" with similarly sized pozzolan particles (e.g., which can have the same or similar particle size distribution and/or fineness as the hydraulic cement particles they replace and/or have an average particle size that significantly exceeds the average particle size of the hydraulic cement particles). Replacing larger hydraulic cement particles with pozzolan particles reduces cost, overall $CO_2$ output, and deleterious effects caused by including too much cement (e.g., creep, shrinkage, alkali-silica reaction, carbonation, and decreased durability).

In one embodiment the d85, d90, d95 or d99 of the hydraulic cement particles may be less than about 30 µm, or less than about 25 µm, or less than about 15 µm, or less than about 7.5 µm, or even less than about 5 µm. In one embodiment, the d10, d15, or d20 of the hydraulic cement may be greater than 0.6 micron, greater than 1 micron, or even greater than 2 microns.

In one embodiment, the tricalcium silicate content of the hydraulic cement may be greater than about 50%, preferably greater than about 57%, more preferably greater than about 60%, and most preferably greater than about 65%. The hydraulic cement may advantageously include a higher concentration of tricalcium silicates as compared to OPC because excess lime released therefrom does not remain as interstitial portlandite ($Ca(OH)_2$), as in concrete made using 100% OPC, but reacts with pozzolan to form calcium-silicate-hydrate ("CSH"). The increased tricalcium silicate content can be used to offset the lack of tricalcium silicates in the pozzolan fraction of the blended cements. The increase in tricalcium silicate may depend in part on the percentage of pozzolan in the blend. For example increased concentrations of tricalcium silicate in the hydraulic cement fraction can be used when percentages of pozzolan are greater than about 20%, preferably greater than about 30%, more preferably greater than about 40%, about 50%, or even about 60%.

While increased calcium content can be beneficial for particle size optimized blended cements as described herein, increased tricalcium silicate content is not required. Moreover, the increased tricalcium silicate concentrations may be advantageously used with traditional particle size distributions of Portland cement and pozzolan (e.g., pozzolans and hydraulic cements where both distributions are substantially overlapping and/or have a majority of particles ranging from 1-45 microns, particularly for blended cements with between 25% and 60% pozzolan, more preferably between 30% and 50% pozzolan).

B. Pozzolans

Pozzolans are usually defined as materials that contain constituents which will combine with free lime at ordinary temperatures in the presence of water to form stable insoluble CSH compounds possessing cementing properties. Pozzolans can be divided into two groups: natural and artificial. Natural pozzolans are generally materials of volcanic origin, but include diatomaceous earths. Artificial pozzolans are mainly products obtained by heat treatment of natural materials such as clay, shale and certain siliceous rocks, and pulverized fuel ash (e.g., fly ash).

Two classes of fly ash are defined by ASTM C-618: Class F and Class C. The chief difference between these classes is the amount of calcium, silica, alumina, and iron content in the ash. Class F fly ash typically contains less than 10% lime (CaO); Class C fly ash generally contains more than 20% lime (CaO). The chemical properties of fly ash are largely influenced by the chemical content of the coal burned (i.e., anthracite, bituminous, or lignite).

Any geologic material, both natural and artificial, which exhibits pozzolanic activity, can be used to make the inventive blended pozzolan cements. Diatomaceous earth, opaline, cherts, clays, shales, fly ash, silica fume, volcanic tuffs, pumices, and trasses are some of the known pozzolans. In order to reduce water demand and thereby improve strength while maintaining desired flow properties, pozzolans having more uniform surfaces (e.g., spherical or spheroidal) may be desirable. An example of a generally spherical pozzolan is fly ash, owning to how it is formed. Ground pozzolans generally have more jagged morphologies, which can increase water demand. Therefore, to the extent a process is able to yield a pozzolan having a more uniform surface, such a process would be desirable.

The lime (CaO) content within the pozzolan fraction can vary from about 0% to about 50% by weight. According to one embodiment, the lime content of the pozzolan will be less than about 35% by weight. In another embodiment, the lime content will be less than about 25%. In yet another embodiment, the lime content will be less than about 15%. In still another embodiment, the lime content of the pozzolan will be less than about 10% by weight. In some cases it may be less than about 5%.

The particle size distribution of the pozzolan fraction with the inventive cements can be similar to that of the larger particle fractions found in OPC (e.g., 10-45 µm). According to one embodiment, the d15, d10, d5 or d1 of the pozzolan particles is at least about 5 µm, at least about 7.5 µm, at least about 10 µm, at least about 15 µm, or even at least about 20 µm. The pozzolan fraction can also have a desired narrow distribution in which the d80, d85, d90, d95, or d99 is less than about 120 µm, preferably less than about 100 µm, more preferably less than about 80 µm, even more preferably less than about 60 µm, and most preferably less than about 45 µm.

Notwithstanding the foregoing, a small percentage of fine pozzolan particles (e.g., about 0.-3 µm) may be desirable to help disperse the fine cement particles and increase fluidity. Moreover, all things being equal, particles that are more spherical or uniform reduce water demand, which means that such particles can be smaller on average compared to more jagged particles while providing the same or lower water demand.

The present invention also includes ternary blends of pozzolan and cement. The ternary blends include a fine pozzolan fraction and a course pozzolan fraction. The fine pozzolan fraction may have a particle size distribution where the d90 is less than about 5 microns. More preferably the d90 is less than 4 microns, 3 microns, 2 microns, or 1 micron. In one embodiment, the fine pozzolan fraction can be a comminuted fraction obtained from classifying a pozzolan to yield an intermediate fine fraction and a coarse fraction and then comminuting the fine fraction to achieve a finer particle size distribution.

The course pozzolan fraction can have similar particle size distributions as those discussed above with respect to the pozzolan fraction of a blended cement (i.e., a d10 greater than 5 microns, 7.5 microns, 10 microns, 15 microns, 20 microns, or 25 microns.

C. Supplemental Lime and Other Bases

As discussed above, hydraulic cements such as Portland cement which contain tricalcium silicate will typically provide excess calcium hydroxide that is available for reaction with the pozzolan. Depending on the relative proportion of tricalcium silicate in the hydraulic cement and the relative quantity of hydraulic cement within the pozzolan cement composition, it may be desirable to include supplemental lime (e.g., calcium oxide or calcium hydroxide) in order to provide additional calcium hydroxide for reaction with the pozzolan fraction and/or to provide consistency to blends that would otherwise vary in composition over time. The amount of supplemental lime may vary from about 0-30% by weight of the overall pozzolan cement composition depending on the amount of pozzolan and deficit of calcium, or about 2-25%, or about 5-20%.

Supplemental lime can be mixed up front with the pozzolan and hydraulic cement in order to yield a more lime balanced cement composition. Alternatively, some or all of the supplemental lime can be added to a fresh concrete or other cementitious composition that includes pozzolan cement within the scope of the invention. The same is true for other admixtures or fillers.

Other bases, such as magnesium oxide, magnesium hydroxide, alkali metal oxides, and alkali metal hydroxides can be added to accelerate the lime-pozzolan reaction.

III. Blended Cement Compositions

The hydraulic cement fraction and the pozzolan fraction are blended together to produce a blended pozzolan cement having a desired particle size distribution and strength developing properties. The determination as to which particle size is selected as the cutoff between larger particles that are predominantly pozzolan and smaller particles that are predominantly hydraulic cement depends on a number of factors. These include a desired reactivity, ratio of pozzolan to hydraulic cement, proportion of fine to coarse aggregates, use of admixtures, accelerants, retardants, hydration stabilizers, and fillers, and the like. In general, increasing the ratio of pozzolan to hydraulic cement can retard strength development while increasing the ratio of hydraulic cement to pozzolan tends to accelerate strength development. Nevertheless, this general trend can be reduced or eliminated by particle size optimizing the cement and/or pozzolan fractions. Supplemental lime or other sources of calcium can accelerate setting, as can increasing the relative quantity of very small hydraulic cement particles (e.g., less than about 10 μm, or less than about 5 μm) compared to large cement and/or pozzolan particles (i.e., smaller hydraulic cement particles hydrate more rapidly than larger particles). Lye and other strong bases can also accelerate strength development by accelerating the lime-pozzolan reaction (e.g., by increasing the rate by which silicate ions are leached from the pozzolan particles).

In an embodiment of invention, a pozzolan cement composition is provided that includes at least about 30% pozzolan and less than about 70% hydraulic cement (e.g., 55-70% hydraulic cement by volume and 30-45% pozzolan by volume). In another embodiment, a pozzolan cement composition is provided that includes at least about 40% pozzolan and less than about 60% hydraulic cement. In another embodiment, a pozzolan cement composition is provided that includes at least about 45% pozzolan and less than about 55% hydraulic cement. In yet another embodiment, a pozzolan cement composition is provided that includes at least about 55% pozzolan and less than about 45% hydraulic cement. In still another embodiment, a pozzolan cement composition is provided that includes at least about 60% pozzolan and less than about 40% hydraulic cement. And in another embodiment, a pozzolan cement composition is provided that includes at least about 70% pozzolan and less than about 30% hydraulic cement.

The pozzolan-hydraulic cement compositions (i.e., blended cements) according to the invention typically include a distribution of particles spread across a wide range of particle sizes (e.g., over a range of about 0.1-120 μm, or about 0.1-100 μm, or about 0.1-80 μm, or about 0.1-60 μm, or about 0.1-45 μm).

In one embodiment, at least about 50%, 65%, 75%, 85%, 90%, or 95% of the combined pozzolan and hydraulic cement particles larger than about 20 μm, 15 μm, 10 μm, 7.5 μm, or 5 μm comprise pozzolan and less than about 50%, 35%, 25%, 15%, 10%, or 5% comprise hydraulic cement. Similarly, at least about 75%, 85%, 90%, or 95% of the combined pozzolan and hydraulic cement particles smaller than about 25 μm, 20 μm, 15 μm, 10 μm, 7.5 μm, or 5 μm comprise hydraulic cement and less than about 25%, 15%, 10%, or 5% comprise pozzolan.

In one embodiment, the desired distribution of hydraulic cement particles in the hydraulic cement fraction can be manufactured or selected to have a desired overlap with the pozzolan fractions. In one embodiment the overlap in the distribution of hydraulic cement with the distribution of pozzolan may be in a range from about 5 vol % to about 60 vol %, more preferably about 7.5 vol % to about 50 vol %, even more preferably about 10 vol % to about 40 vol %, and most preferably about 15%-30%. Even more preferred ranges include ranges using various combinations of the foregoing endpoints. In one embodiment, the cement fraction of the blend having the foregoing overlap also has a d90 in a range from about 5-30 microns, more preferably about 7.5-25 microns and most preferably in a range from about 10-20 microns. The foregoing ranges in overlap in particle size distributions may be used for binary or ternary blended cements.

Stated another way, the pozzolan cement blended compositions may have a d10, d15, or d20 that is greater than about 0.8 micron, greater than about 1 micron, greater than about 2 microns, or even greater than about 3 microns. The blended pozzolan cement compositions may have a d80, d85, or d90 that is less than about 90 microns, less than about 70 microns, or less than about 50 microns. The d50 of the blended cements can be in a range from about 8-20 microns, more preferably about 9-18, most preferably in a range from about 10-16 microns.

Producing blended cements with one or more of these distribution characteristics can maximize strength development while minimizing water demand and may be particularly advantageous for making cements that can substitute for OPC and can be used in the ready mix cement industry. In contrast, cements that have an overabundance of fine hydraulic cement particles may react too rapidly during early strength development and damage the initial cement crystals. These cements also tend to have poor long-term strength development because the fine cement particles become fully hydrated in the early period (e.g., 1-3 days), which means there is less tricalcium silicate to develop strength during later periods (e.g., 7-28 days).

In one embodiment, the blended cement of the invention includes ternary blended cement. In this embodiment, the fine pozzolan fraction has a d50 finer than the d50 of the cement, and the coarse pozzolan fraction has a d50 greater than the d50 of the cement such that the majority of cement particles are intermediate the fine pozzolan fraction and the course pozzolan fraction. The ternary blends can have an overlap of pozzolan and cement distributions that is similar to binary blends discussed above. For ternary blends, the cement composition may be somewhat coarser than typically used in a binary blend although such is not required. In one embodiment, the d10, d15, or d20 of the cement fraction together with the coarse pozzolan fraction (i.e., not including the fine pozzolan fraction) may be greater than about 1 micron, greater than about 2 micron, greater than about 3 microns, or even greater than about 4 microns. The ternary blends may include about 1-30 vol % fine pozzolan, more specifically 2-20 vol %, or even more specifically 3-15 vol %. In this embodiment, it may be desirable to include additional calcium and/or lye to accelerate the reaction of the fine pozzolan fraction.

At least in the case of binary blends, the pozzolan fraction will generally have an average particle size that exceeds the average particle size of the hydraulic (e.g., Portland) cement fraction. In general, the average particle size of the pozzolan fraction is in a range of about 1.25 times to about 50 times the average particle size of the hydraulic cement fraction, preferably from about 1.5 times to about 30 times, more preferably from about 1.75 times to about 20 times, and most preferably from about 2 times to about 15 times the average particle size of the hydraulic cement fraction.

Stated another way, the Blaine fineness of the hydraulic cement fraction may be about 1.25 times to about 50 times that of the pozzolan fraction, preferably 1.5 times to about 30 times, more preferably about 1.75 times to about 20 times, and most preferably about 2 times to about 15 times the Blaine fineness of the pozzolan fraction.

For example, the Blaine fineness of the hydraulic cement fraction can be about 500 $m^2/kg$ or greater, preferably about 650 $m^2/kg$ or greater, and more preferably about 800 $m^2/kg$ or greater, and the Blaine fineness of the pozzolan fraction can be about 325 $m^2/kg$ or less, preferably about 300 $m^2/kg$ or less, more preferably about 275 $m^2/kg$ or less.

According to one embodiment, a high early strength pozzolan cement can be made which has a Blaine fineness and particle size distribution (e.g., as described by the Rosin-Rammler-Sperling-Bennet distribution) that approximates that of OPC. In this way, the cement composition can behave similar to OPC in terms of water demand, rheology and strength development.

In one embodiment, the available tricalcium silicate content for the blended cement can fall within the range of available tricalcium silicates for a Type I, Type II, or Type III cement. The available tricalcium silicate content depends in part on the surface area of the hydraulic cement. In one embodiment, the tricalcium silicate content and/or the effective tricalcium silicate content of the blended cement can be greater than 45%, preferably greater than 50%, more preferably greater than about 57%, and most preferably greater than about 60%. In an alternative embodiment, the effective tricalcium content is maintained within the foregoing ranges for the volume % of particles between 0.1-50 microns, more preferably 1 micron to about 45 microns, and most preferably between about 2 microns and 30 microns.

As mentioned above, the pozzolan cement blends of the invention can substitute for OPC, including Type I, Type II, Type III, and Type V cements. Type I and Type II cements are commonly terms used to refer to a binder with characteristics defined by ASTM C-150. As those skilled in the art will appreciate, general purpose blended cements that can substitute for ASTM C-150 cement should have set times and other performance characteristics that fall within the ranges of ASTM C-150 in order to serve as a substitute for Type I, Type II, Type III, or Type V cement in the ready mix industry. In one embodiment, the blended cement meets the fineness and/or set time requirements of a Type I/II OPC, as defined in ASTM C-150-08 or C-150-00, which are both incorporated herein by reference. In one embodiment, the pozzolan cement blends of the invention can have a fineness in a range from about 150 $m^2/kg$ to about 650 $m^2/kg$, preferably about 280 $m^2/kg$ to about 600 $m^2/kg$, more preferably about 300 $m^2/kg$ to about 500 $m^2/kg$, and most preferably about 350 $m^2/kg$ to about 450 $m^2/kg$.

In a preferred embodiment, the set time of the pozzolan cement composition is within the ASTM C-150 standard for set time, which uses a Vicat test according to C-191, which is also incorporated herein by reference. In one embodiment, the initial set time is in a range from about 30 minutes to about 500 minutes, more preferably about 45 minutes to about 375 minutes, and most preferably about 60 minutes to about 350 minutes.

In one embodiment, the pozzolan cement has an autoclave expansion max % as defined by C-151, which is also hereby incorporated herein by reference, of less than 0.9, more preferably 0.80.

In one embodiment, the pozzolan cement meets the compressive strength test of Type I/II cements according to ASTM C-150, which defines strength according to ASTM C-109, which is hereby incorporated by reference. In one embodiment, the 3-day strength of the pozzolan cement blend is at least about 10 MPa, more preferably at least about 12 MPa. In one embodiment, the 7-day strength of the pozzolan cement blend is at least about 17 MPa, more preferably at least about 19 MPa. In one embodiment, the 28-day strength of the pozzolan cement blend is at least about 28 MPa, more preferably at least about 32 MPa.

In one embodiment, the pozzolan cement blends can have similar performance characteristics of Type I/II cement rather than Type III cement, which is a rapid hardening cement and not generally as beneficial for the ready mix industry. Where type I/II cement is mimicked, the early strength is preferably less than that of type III cement, which will result in better long term strength. In this embodiment, the 3-day strength of the pozzolan cement blend, according to ASTM C109, may be less than about 70% of the 28 day strength, or even less than about 60%, 50%, or 40% of the 28 strength. Developing strength evenly over 28 days can have a substantial beneficial impact on ultimate strength.

The pozzolan cement blend may have any other features of Type I or Type II cement as set forth in ASTM C-150. In addition, the pozzolan cement blend may have any features set forth in ASTM C-595-08 for blended cements. In one embodiment, the maximum weight percent of pozzolan in the pozzolan cement blend of the invention can be about 40% or less. Depending on the relative densities of Portland cement and pozzolan, the volume percent of pozzolan may be significantly more than 40% (e.g., 50%) even if the weight percent is only 40%. Limiting the weight percent of pozzolan can minimize the effects of variable chemistry in the most pozzolan sources.

The reactivity of the hydraulic cement fraction can be selected or adjusted to counterbalance the reactivity of the pozzolan fraction (e.g., by reducing or increasing the average particle size or fineness to increase or reduce reactivity, increasing or decreasing the proportion of tricalcium silicate relative to dicalcium silicate to increase or decrease reactivity, increasing or reducing the quantity of supplemental lime, increasing or decreasing the quantity of gypsum, and the like). For example, where the pozzolan is slower reacting, it may be desirable to increase reactivity of the hydraulic cement fraction. Conversely, where the pozzolan is faster reacting, it may be desirable to decrease reactivity of the hydraulic cement fraction to maintain a desired overall reactivity. By adjusting the reactivity of the hydraulic cement fraction so as to best accommodate the reactivity of the available pozzolan, the present invention permits the manufacture of pozzolan cement having a desired level of reactivity and early strength development while using a wide variety of different available pozzolans.

In some cases, it may be desirable to include inert fillers in order to provide a pozzolan cement having setting properties similar to OPC. According to one embodiment, the inert filler may include coarser particles (e.g., 20-300 µm). The inert filler may include inert fillers known in the art, examples of which include ground stone, rock and other geologic materials (e.g., ground granite, ground sand, ground bauxite, ground limestone, ground silica, ground alumina, and ground quartz).

While the ranges provided herein relative to the particle size distributions of pozzolan and hydraulic cement are expressed in terms of weight percent, in an alternative embodiment of the invention, these ranges can be expressed in volume percent. Converting weight percent to volume percent may require using ratios of the densities of the various materials.

IV. Obtaining Particle Size Optimized Cement and Pozzolan

Any known method for obtaining hydraulic cement and fly ash having a desired particle size distribution and/or fineness can be used within the scope of the present invention. In general, particle size optimized hydraulic cement can be obtained by comminuting and classifying cement clinker so as to have a desired particle size distribution.

FIG. 1 illustrates a system 100 for carrying out the methods described herein. In one embodiment, an initial stream of pozzolan particles (e.g., with particle sizes distributed over a range of about 0.1-100 µm) can be stored in silo 110. An initial stream of hydraulic cement particles (e.g., Portland cement with particle sizes distributed over a range of about 0.1-45 µm) can be stored in silo 112. The initial pozzolan stream is delivered to an air classifier 114 and a top cut at a desired d90 (e.g., about 45 µm) is performed. Particles above the top cut (e.g., about 45 µm) can then be ground to yield particles smaller than the top cut in grinder 116 in a closed circuit indicated by arrows 118. Classifier 114 and/or a second classifier (not shown) can be used to dedust the pozzolan to remove at least some of the particles less than a desired d10 (e.g., about 10 µm) if the pozzolan source is finer than desired. The modified stream of pozzolan particles between the bottom cut and top cut (e.g., distributed over a range of about 10-45 µm) are then delivered to mixer 120 for mixing.

The initial stream of hydraulic cement from silo 112 is delivered to air classifier 122 and cut at a desired d90 (e.g., about 10 µm). The fine cement particles are delivered to mixer 120 and the coarse cement particles are delivered to grinder 124 and ground in a closed circuit as indicated by arrows 126 to achieve a particle size distribution having the desired d90 (e.g., about 10 µm). The ground cement particles are also delivered to mixer 120 and mixed to produce the blended pozzolan cement. The classified and ground cement particles comprise a modified stream of hydraulic cement particles. Mixer 120 can be any blending apparatus known in the art or can even be a grinder. In the case where mixer 120 is also a grinder or other comminution device, some reduction in the particle sizes of cement and pozzolan would be expected although the amount of comminuting can be selected, or even minimized, to mainly ensure intimate mixing of the cement and pozzolan particles rather than grinding. The pozzolan cement blend from mixer 120 can then be delivered to one or more storage hoppers 128 for later use or distribution.

System 100 can be used to produce cement particles and pozzolan particles within any of the particle size distribution ranges described in this application. In addition, system 100 can include more or fewer comminution devices, classifiers, conduits, bag houses, analytical instrumentation, and other hardware known in the art. Hydraulic cement and pozzolan particles can be stored and moved in system 100 using any techniques known in the art, including conveyors, pneumatic systems, heavy equipment, etc. The hydraulic cement can be provided as ground cement or as clinker. As such, system 100 can be incorporated into a finish mill as understood in the cement art. In addition, system 100 can use open circuit milling in addition to or as an alternative to closed circuit milling. While system 100 shows the coarsest pozzolan particles being comminuted, those skilled in the art will recognize that pozzolan is often a waste material and the use of the removed coarse and fine pozzolan fractions is not necessary.

According to one embodiment, hydraulic cement clinker can be ground according to known methods, such as using a rod mill and/or ball mill. Such methods typically yield cement having a wide particle size distribution of about 0.1-100 µm. Thereafter, the ground cement is passed through an air classifier in order to separate the fine particle fraction. The coarse fraction can be returned to the grinder and/or introduced into a dedicated grinder in order to regrind the coarse fraction. The reground cement material is then passed through an air classifier in order to separate the fine particle fraction. The fine fraction from the second classification step can be blended with the fine fraction from the first classification step. This process can be repeated until all the cement has been ground and classified to a desired particle size distribution. Repeatedly classifying the ground cement, regrinding the coarse fraction, and blending together the fine fractions advantageously yields a fine cement material having substantially the same chemistry as the clinker from which it is made. Grinding aids and blending components (e.g., gypsum) known in the art can be added during or after the grinding process.

In an alternative embodiment, finished hydraulic cement such as OPC can be classified in order to separate the fine fraction from the coarse fraction, regrinding the coarse fraction, classifying the reground material, and blending the first and second fine fractions. This process can be repeated until all the cement has been ground and classified to the desired particle size distribution. Repeatedly classifying the ground cement, regrinding the coarse fraction, and blending together the fine fractions advantageously yields a fine cement material having substantially the same chemistry as the original hydraulic cement. Moreover, all of the cement is used. None is wasted. By way of example, the first classification step might concentrate gypsum in the fine fraction, as gypsum is often concentrated in the fine particle fraction of OPC. Regrinding the coarse fraction and blending the newly obtained fine fraction(s) with the original fine fraction can restore the original balance of gypsum to calcium silicates and aluminates.

The pozzolan fraction (e.g., fly ash), to the extent it contains an undesirable quantity of very fine and/or very coarse particles, can similarly be classified using an air classifier in order to remove at least a portion of the very fine and/or very coarse particles. Very coarse pozzolan particles (e.g., greater than about 60-120 μm) removed during classification can be ground or otherwise treated (e.g., by other fracturing methods known in the art) so as to fall within the desired particle size distribution. Very fine pozzolan particles (e.g., less than about 10 μm) removed during the classification process can be sold to end users (e.g., grout manufacturers) as is or further ground into an ultra-fine product (e.g., d50 less than about 3 μm or 1 μm) so as to yield a highly reactive pozzolan material that can act as a substitute for relatively expensive pozzolans such as silica fume and metakaolin used to form high strength concretes with decreased pore permeability.

In one embodiment, the pozzolan fraction may be provided as a relatively coarse feed, and the coarsest fraction comminuted to produce a pozzolan material having a relatively low percentage of fines, thereby obviating, or at least reducing, the need to remove the fines. For example, in a fly ash having a d10 of 5 microns, a d50 of 50 microns, and a d90 of 120 microns, removing the fly ash particles between 60-120 microns and comminuting them to 20-50 microns may raise the d10 to something like 10-15 microns without having to remove any fly ash fines. In this way, a desired particle size distribution of fly ash can be obtained while using most or all of the fly ash stream. This reduces waste and may increase the economic viability of the manufacturing process.

The present invention also includes blended cements manufactured according to the methods disclosed herein and/or providing a pozzolan fraction manufactured according to the methods disclosed herein and blending it with a hydraulic cement, and/or providing a hydraulic cement manufactured according to a method disclosed herein and blending it with a pozzolan.

System 100 can be operated using a control module 200 represented schematically in FIG. 1 as a box. Control module 200 includes a computer running computer executable instructions for receiving input and sending output to one or more components in system 100. For example, control module 200 can be operable to receive and/or send input to control the operation of loading and unloading silos 110 and 112, classifiers 114 and 112, and grinders 116 and 124. Control module 200 can control a blower speed and/or drum speed in classifiers 114 and 122 and/or the extent of comminution in grinders 116 and/or 124.

V. Methods and Systems that Utilize an Online Detector

In one embodiment, the present invention includes methods and systems for making a hydraulic cement fraction and/or a pozzolan fraction of a blended cement using at least one online detector. The online detector is configured to sample a characteristic of either or both of the fractions that can be modified to produce a blend with improved properties. In one embodiment, the online detector can be a particle size analyzer that can be used to achieve proper particle size distributions having a desired overlap and/or distribution such as those discussed above.

Many sources of pozzolan produce a stream of pozzolanic materials that vary over time. These inconsistencies can be very problematic for concrete manufactures. The present invention includes, but is not limited to, embodiments where a blended cement having a desired distribution of pozzolan and hydraulic cement and/or chemical composition is achieved using an online detector. The online detector measures the distribution and/or chemical composition of an initial hydraulic cement or pozzolan and/or a modified hydraulic cement or pozzolan to produce a series of measurements over time. A control module receives the measurements and modifies comminution and/or classification of the cement and/or pozzolan to achieve a desired product.

Figure 2:
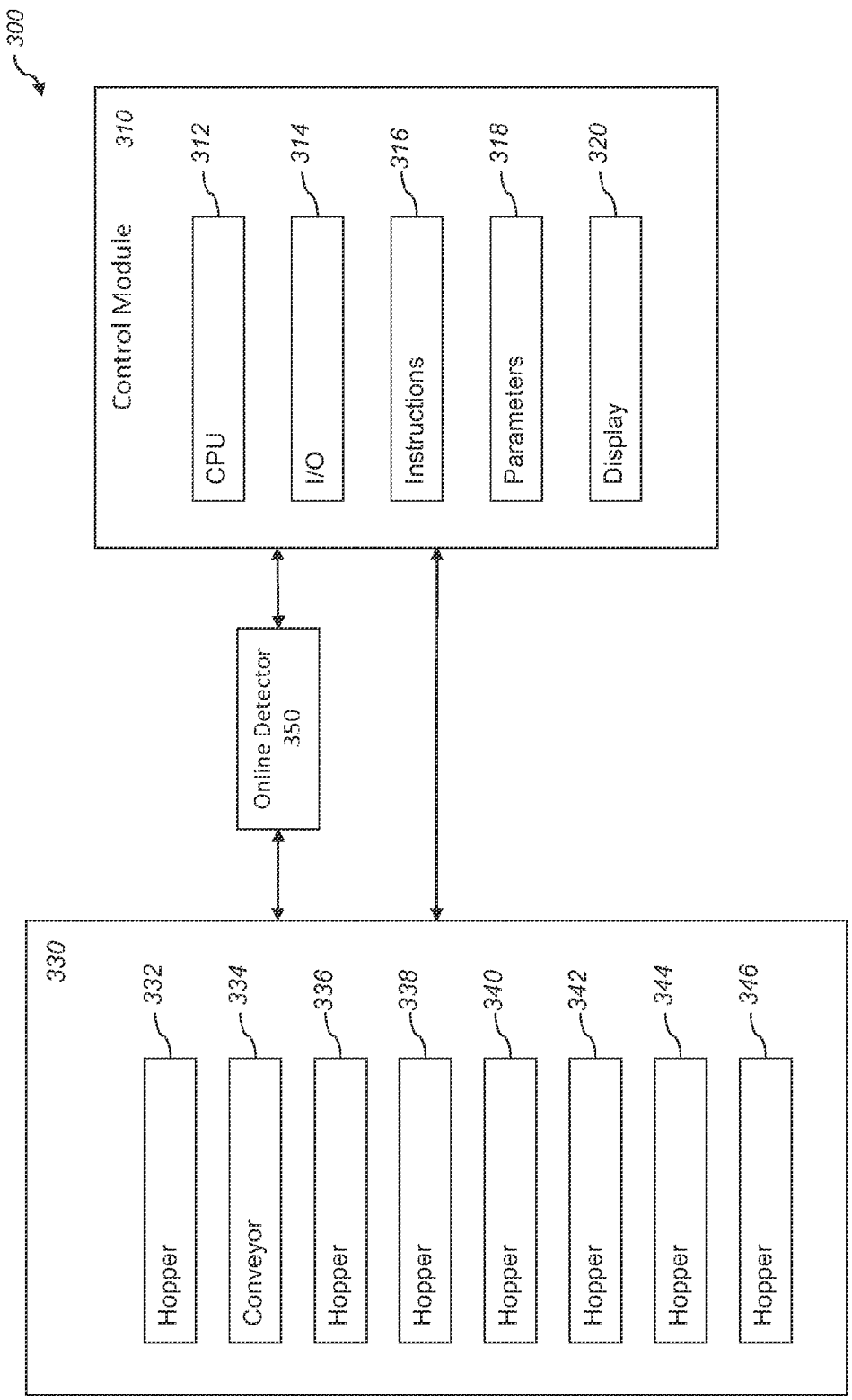
FIG. 2 is a schematic of a system for manufacturing a cement fraction, a pozzolan fraction, and/or a blended cement using an online detector and a control module.

FIG. 2 is a schematic illustration of a system 300 for manufacturing cement fraction, pozzolan fraction, and/or a blended cement having desired chemical composition and/or particle size distribution and/or a decreased variability over time in particle size and/or chemical composition. System 300 includes an online detector 350, a control module 310 and a sizing system 330. Control module 310 includes a central processing unit 312, an I/O interface for receiving input from online detector 350 and sizing system 330 and for outputting control output to sizing system 330 and/or online-detector 350. Control module 310 also includes computer executable instructions 316 (i.e., software) configured to operate CPU 312 and I/O 314, sizing system 330, online detector 350, and any other components of a cement or pozzolan manufacturing and/or blending facility. Instructions 316 also include instructions for performing calculations using parameters 318 and determining whether the particle size and/or chemical composition of pozzolan and/or blended cement is within a desired range. Control Module 310 may also include a display for showing the status of the system's operation, displaying queries for receiving input from an operator, and/or for provide warnings to operators in the event of a problem occurring in system 300.

Sizing system 330 can include any equipment know for use in manufacturing a pozzolan fraction of a blended cement and/or manufacturing blended cements. Examples of sizing system components include, but are not limited to, grinders, classifiers, conveyors, heaters, and fans. Sizing system 330 can be configured to process about 5-500 tons of pozzolan or blended cement per hour, preferably about 20-300 tons per hour, or 30-200 tons per hour. Sizing system can include silos and/or hoppers 332 for storing and/or loading metered quantities of feed material such as, but not limited to pozzolan, cement, chemical admixtures, and the like. Control module 310 can be coupled to hoppers for controlling the amount and timing of materials metered from hopper 332. System 330 can also include conveyors for conveying material to the various components of system 330, including pneumatic conveyors and/or belt conveyors. Control module 310 can be coupled to conveyors to control flow rates and/or direction through the conveyance system (e.g., by controlling one or more valves or metering devices). Control module 310 can also be coupled to one or more fans 336 for controlling material flow, temperatures, and/or size separation. Control module 310 can be coupled to one or more comminution devices 338 for controlling the extent of comminution, the rate of comminution, drum rotation rate, comminution temperature, and/or the rate of loading and/or unloading of comminution device 338. Control module 310 can be coupled to one or more chemical injectors for adding metered quantities of chemicals to a pozzolan fraction and/or a blended cement. Control module 342 can be coupled to a mixer for blending two or more sources of pozzolan and/or cement, controlling the timing of loading, the extent of mixing, the rate of mixing, and/or the temperature of mixing. Control module 310 can be coupled to a classifier 344 for controlling the particle size cutoff of classification, the fan speed of classifier 344 and/or drum rotation speed, loading of classifier 344 and/or any other parameters of operating classifier 344. Control module 310 can also be coupled to a bag house 346 for controlling the rate and timing of cleaning bag house 346 and/or the conveyance of materials to and from bag house 346. Those skilled in the art will recognize that there may be other equipment useful in particle sizing that can be used in system 330 and controlled by control module 310 according to the present invention. As discussed more fully below, control module 310 can be configured to calculate the proper control parameters for any of the foregoing devices using readings from online detector 350.

Online detector 350 is an analytical instrument configured to periodically receive samples of a pozzolan stream and/or cement stream and/or a blended cement and measure the particle size or chemical composition of the pozzolan stream and/or cement stream and/or blended cement. The online detector can be a particle size analyzer, an XRD analyzer, or other instrument suitable for sampling a pozzolan stream. The sample of pozzolan, cement, or blended cement can be taken from a conveyor duct or a temporary storage unit (e.g., silo) or from any component of system 330. In a preferred embodiment, the sample is taken from a stream of the pozzolan, cement, or blended cement. The sample is then analyzed to determine one or more characteristics, such as, but not limited to, the particle size distribution and/or the chemical composition. A reading of the characteristic is generated and sent to control module 310 as input thereto. In one embodiment, the sample size may be in a range from about 1 g to about 500 g, more preferably about 2 g to about 300 g, and most preferably about 5 g to about 150 g. The sampling can be carried out automatically and periodically to obtain a series of readings of one or more characteristics of the pozzolan, cement, or blended cement stream.

In one embodiment, the online detector is configured to samples the characteristic of the stream at least hourly, more preferably at least about every 5 minutes, even more preferably at least every minute, or even at least every second with at least about 20% uptime during the operation of system 330, more preferably at least 50% uptime, even more preferably at least about 75% uptime, and most preferably at least about 90% uptime of the operation of system 330. Using multiple online analyzers can allow sampling rates in these intervals and even shorter intervals.

In one embodiment, the online detector may be an online particle size analyzer. The online particle size analyzer can measure the particle size distribution using dry or wet methods. In one embodiment, the particle size analyzer measures distributions from at least about 1 micron to about 60 microns, more preferably at least about 0.2 microns to about 100 microns. An example of a suitable commercially available online particle size analyzer is the Malvern Insitec Finesess Analyzer available from Malvern Instruments (Worcestershire, UK).

In an alternative embodiment, the online analyzer may be a chemical analyzer configured to measure one or more chemical characteristics of the pozzolan stream and/or cement stream and/or blended cement stream. In one embodiment, the chemical analyzer may be an X-ray diffraction analyzer configured to measure one or more of gypsum, silicate, aluminate, calcium oxide, carbon, or iron. Methods and apparatus for performing x-ray diffraction can be found in U.S. Pat. No. 6,735,278 to Madsen, which is hereby incorporated by reference. Examples of suitable commercially available XRD analyzers include the Continuous On-Stream Mineral Analyzer from FCT-ACTech Pty Ltd, (Melbourne, Australia) and the BTX analyzer available from inXitu (Mountain View, Calif., USA).

Control module 310 receives the readings from online detector 350 and uses the readings to determine undesired variation in the pozzolan stream, cement stream and/or blended cement stream. The undesired variation can be a variation in the pozzolan, cement, or blended cement that was generated during processing of the pozzolan, cement, or blended cement in system 330 or the undesired variation may be have existed in the pozzolan or cement since its formation.

For example, particle size analyzer 350 may be positioned downstream from classifier 344 and comminution device 338. Particle size analyzer 350 periodically outputs a plurality of particle size distribution (i.e., readings) that are received by control module 310. Control module 310 is configured to receive the readings and analyze the readings according to instruction 316. Control module 310 includes one or more particle size distribution parameters. The distribution parameters establish the desired characteristic of the particle size distribution of the pozzolan fraction and/or the blended cement. The distribution parameter may be a desired volume percent of particles above and/or below a particular particle size and/or a desired volume of particles within a particular range of particle sizes as described above. The control module may compare the actual particle size readings to the distribution parameters to determine if the actual particle size distribution is within a desired range of the distribution parameter. Control module 310 also includes instructions for controlling comminution device 338, classifier 344, and/or other equipment of system 330 to modify the distribution of the pozzolan fraction and/or blended cement being produced from system 300. For example, where the d10 of the pozzolan fraction is too fine as compared to a desired distribution parameter for the d10, control module 310 may cause comminution device 338 to grind more coarsely and/or to increase the coarseness of the classification of classifier 344.

In one embodiment, control module 310 uses online detector 350 as a feedback loop to effectuate changes in the particle size distribution upstream from online detector 350. Alternatively or in addition, the measurements of online detector 350 can be used to control the blending and/or addition of chemical admixtures downstream from online detector 350 to achieve a desired particle size distribution and/or chemical composition for a pozzolan fraction and/or a blended cement fraction. The chemical characteristics and/or particle size distribution obtained from the online detector in the manufacture of a batch of pozzolan can be used to blend Portland cement and/or other pozzolans and/or admixtures to compensate for a deficiency in the chemical composition and/or particle size distribution of the material produced. For example, a finer or coarser pozzolan and/or cement may be blended with the pozzolan fraction produced from system 300 to achieve a desired pozzolan fraction and/or blend and/or lime, gypsum, hydration stabilizer, water reducer, surfactant, or other admixture can be added to the pozzolan fraction or blended cement according to the determination made by control module 310. The desired modification can be made by control module 310 using any number of mixers 342, chemical injectors 340, and/or chemical reagents.

While downstream control of blending will usually include actually controlling mixing of two or more components, in one embodiment, control module 310 can output an alphanumeric reading that is associated with the pozzolan fraction to indicate proper blending of the pozzolan fraction, cement fraction, and/or other chemical admixture to achieve a desired pozzolan fraction and/or blended cement.

Software suitable for implementing control module 310 includes, but is not limited to the Pavilion8™ software platform from Pavilion Technologies (Austin, Tex., USA), which is a division of Rockwell Automation Company (Milwaukee, Wis.). Examples of methods and systems that can be used to operate control module 310 can also be found in U.S. Pat. Nos. 5,305,230, 6,735,483, 6,493,596, 7,047,089, and 7,418, 301, and U.S. publication number 2006/0259197, all of which are hereby incorporated by reference.

In some embodiments, control module 310 can obtain a particle size distribution of a cement fraction and/or an additional pozzolan fraction to be blended with the pozzolan fraction being modified in system 330. Control module 330 then uses the summed distributions to compare with a distribution parameter to determine whether the pozzolan stream is producing a desired pozzolan fraction within a desired range of the parameter.

In an alternative embodiment, system 300 can be used to produce a desired cement fraction, in which case, a cement stream is substituted for the pozzolan stream in the foregoing description of system 300. Control module 310 can control comminution and/or classifying of the cement stream to produce a cement fraction that is particle-size-optimized for blending with a pozzolan fraction. Control module can obtain a distribution of a pozzolan fraction to be blended with the cement fraction produced in system 300 and control module 310 can control comminution and/or classification of the cement fraction to have a desired distribution for blending with the particle size optimized pozzolan fraction.

The control module can be used to control manufacturing of a pozzolan fraction with particular particle size distribution characteristics important for matching the top end of a cement fraction with a bottom end of a pozzolan fraction. Control module 310 can be used to manufacture pozzolan fractions with particular distributions of particles in the d5-d45 portion of the distribution, more particularly the d10-d40 or d15-d35 (i.e., the distribution parameters (e.g., size parameters) define a desired particle size or particle size range for the volume of particles in the foregoing ranges of the distribution). In one embodiment, the particle size of the distribution parameter is in a range from about 2-35 microns, about 5-30 microns, about 7.5-25 microns, or 10-20 microns within the foregoing volume percent ranges. Where system 300 is used to produce a cement fraction, the distribution parameter can define the particle size for particles that fall within the d55-d98, d60-d95, or d70-d90. In one embodiment, the particle size of the distribution parameter is in a range from about 5-30 microns, about 7.5-25 microns, or about 10-20 microns.

In some embodiments, control module 310 may control two or more components of system 330 to simultaneously change two or more characteristics of the distribution of the pozzolan stream. For example, the d90 of the pozzolan fraction can be decreased by increasing comminution 338, and the d10 can be simultaneously be made coarser by increasing the coarseness of classification using classifier 344.

System 300 may be used to produce a cement fraction, a pozzolan fraction, and/or a blended cement having any of the characteristics described herein. System 300 may also be used alone or in combination with any of the methods disclosed herein.

VI. Controlling Chemical Composition in a Blended Cement

The present invention also includes methods that can be used alone or in combination with an online detector to control the chemical variation in a blended cement or the pozzolan fraction of a blended cement.

In this invention, the chemical composition of the pozzolan is measured over time to produce a series of measurements that reveal the chemical variation of the pozzolan. Typically, the measurement will be made using an online analyzer such as an online XRD instrument. In some embodiments, the "effective chemical content" can be approximated or measured. As discussed above, the chemical reactions that occur in the hydration of cement are most directly related to the availability of the chemical constituents (e.g., silicates, aluminates, ferrates, calcium oxide, etc) on the surface of the particles. Thus, particles that have substantially different surface areas may have the same vol % or mass % of a particular chemical constituent yet provide very different "effective chemical content." Similarly, pozzolan and cement materials that have very different vol % or mass % of a particular constituents may perform similarly if they have a similar "effective chemical content" (also referred to herein as "effective chemical concentration"). For purposes of this invention, the term "effective chemical content" refers to a percentage of a chemical constituent in the blended cement or a fraction thereof where the percentage accounts for the surface area of the particles of that fraction. The "effective content" can be a direct measurement of the chemical constituent on the surface of the fraction (e.g., using a microscope) or may be an approximation of the effective amount using the surface area of the fraction to mathematically adjust for the difference in the availability of the chemical constituent (or similar approximation technique). The effective chemical content can be used to determine the proper blending of one or more pozzolan fractions, one or more hydraulic cement fractions, and/or one or more chemical admixtures to make a blended cement with a desired reactivity based on the surface area of chemical constituents available for reaction. By way of example, and not limitation, an effective mineral content (e.g., effective tricalcium silicate content) of a cement fraction, a pozzolan fraction, or a blended cement fraction can be calculated according to the following 3 equations, respectively: $E_c=[(F_c*M_c)]$, $E_p=(F_p*M_p)]$ and $E_b=[(F_c*M_c*V_c)+(F_p*M_p*V_p)]$. where $E_c$ is the effective chemical (e.g., mineral) content in the cement fraction, $E_p$ is the effective mineral content in the pozzolan fraction, $E_b$ is the effective mineral content in the blended cement, $F_c$ is the surface area of the cement fraction, $M_c$ is the mineral content in the cement fraction, $V_c$ is the volume percent of cement in the blended cement, $F_p$ is the surface area of the pozzolan fraction, $M_p$ is the mineral content in the pozzolan fraction, and $V_p$ is the volume percent of pozzolan in the blended cement. The actual effective mineral content for the blended cement can also be calculated by dividing $E_b$ by $F_b$ where $F_b$ is the surface area of the blended cement. The effective mineral content may be calculated for tricalcium silicates, dicalcium silicates, aluminates, gypsum, lime, carbon, and the like.

In one embodiment, a direct measurement of the effective concentration can be determined using a binding assay for the chemical constituent. The effective chemical content can be approximated by binding a chelating agent to the surface of the pozzolan or cement particles and detecting a change in the concentration of the binding agent. By way of example and not limitation, the available calcium oxide on the surface of a cement or pozzolan can be determined using a calcium chelating agent in a binding assay. The effective calcium oxide concentration can be determined placing a known quantity of cement or pozzolan into a solution of calcium chelating agent having a known concentration, allowing the calcium chelating agent to bind the cement or pozzolan, removing the cement or pozzolan particles from the solution, and detecting the change in concentration of the chelating agent in the solution. The reduction in the concentration of the calcium chelating agent in the solution can be correlated to a concentration on the surface of the particles. Similar binding assays can be performed using chelating agents for aluminates and other constituents of a pozzolan and/or cement. In some embodiments, two or more chelating agents to two or more different constituents can be used separately or simultaneously to provide higher resolution of selective binding.

In one embodiment, the invention relates to achieving a desired concentration of calcium oxide in a pozzolan fraction of a blended cement. In this embodiment, a first source of pozzolan is provided that varies over time in its calcium oxide content. The variation in the calcium oxide content can be in a range from about 1% to 50% by volume (or 5%-40%). The calcium content can be measured using an online chemical analyzer such as a XRD analyzer. In one embodiment, the effective calcium oxide is measured. The effective calcium oxide content can be measured directly by approximating the surface area of the pozzolan and the vol % of calcium oxide.

In this embodiment the pozzolan fraction can be made with a relatively constant calcium concentration by blending a second source of pozzolan having a different calcium concentration. The second source of pozzolan may have a calcium content that is relatively constant or may vary over time. If the second source of pozzolan varies over time, it may be desirable to measure the calcium concentration of the second source of pozzolan using an online chemical analyzer such as an XRD analyzer.

The pozzolan fraction is made to have a relatively constant calcium content by blending the first and second pozzolan streams in ratios that produce a combined pozzolan fraction that varies in calcium (or the effective calcium) less than one or both of the first and second pozzolan streams. To illustrate a hypothetical example, a first pozzolan source may have an effective calcium oxide content of 40% that varies periodically to 25%. A second pozzolan source having an effective calcium oxide content of 10% can be blended with the first pozzolan at a ratio 50:50 when the first pozzolan source is at 40% and then blended at a ratio of 100:0 when the calcium oxide is at 25%. In this manner, the effective calcium oxide content can remain 25% by vol over time. Those skilled in the art will recognize that the two different pozzolan sources can be mixed in ratios from 100% of the first pozzolan source to 100% of the second pozzolan source to achieve any desired calcium oxide content between the first pozzolan source and the second pozzolan source.

The first and second pozzolan sources can be of the same type or different types of pozzolans. In one embodiment, the first pozzolan is a class C fly and the second pozzolan source may be a Class F fly ash. In alternative embodiments, the first and second pozzolan sources may be both class F or both class C. In one embodiment, the two different pozzolan sources are from the same hydrocarbon power plant and the first pozzolan source and the second pozzolan source are collected during different conditions of operations (e.g., differences in ambient temperature, burner temperature, feed material, load, or any other factor that may affect effective calcium oxide content).

In yet another embodiment, the pozzolan fraction may be a blend of three or more pozzolan sources. A blend of three or more different pozzolan sources can also be used to reduce variation in chemical composition other than calcium. For example, a third or additional pozzolan source may be used to reduce variation in mineral contents such as silicates, magnesium, sulfates, iron and the like. A third pozzolan source may also be used to reduce the variation in carbon content.

The calcium content or effective calcium content can also be modified to produce a pozzolan fraction and/or blended cement with a relatively constant calcium content and/or reactivity by taking a series of measurements of the calcium content of the variable pozzolan stream and modifying the stream by adding a hydration stabilizer to reduce the potency of the calcium during initial hydration and/or setting. The hydration stabilizer is preferably a calcium chelating agent. The amount of hydration stabilizer added can be selected to chelate the desired quantity of calcium through the highest heat of hydration of the hydrating cement. Suitable amounts include 1-10 oz of hydration stabilizer per hundred lbs of hydraulic cement. The hydration stabilizer can be added to the pozzolan fraction or to the blended cement.

In yet another embodiment, a pozzolan fraction and/or blended cement having a relatively constant calcium content and/or reactivity can be produced by taking a series of measurements of the calcium content of a hydrocarbon feed material (e.g., coal) that is to be burned (e.g., in a coal fired power plant). The feed material is mixed with a calcium producing material (e.g., limestone) to produce a modified feed material. The calcium producing material is blended with the feed material in proportions that will produce a desired calcium content in the ash resulting from burning the modified feed material. In one embodiment, the calcium content of the ash resulting from burning the modified feed is greater than 5%, greater than 15%, greater than 25%, greater than 35%, or even greater than 45%. In one embodiment, the resulting ash can be a class C fly ash. The ash can have a relatively constant calcium content. In one embodiment, the ash resulting from burning the modified ash varies over time less than the calcium in the feed material.

In one embodiment, the difference in variation of the calcium content, effective calcium content, and/or calcium reactivity of a modified pozzolan fraction and/or a blended cement produced using any of the methods described herein is less by at least 1% in over a period of 1 month, more preferably over a period of 1 week, and most preferably over a period of 1 day. More preferably the difference in variation of the calcium content and/or effective calcium content, and/or chemical reactivity of the calcium is less by at least 2%, 3%, 4%, or 5% over a period of 1 month, 1 week, or 1 day as compared to not chemically modifying the pozzolan fraction and/or blended cement. The decrease in variation can also be measured according to the maximum variation in the pozzolan fraction or blended cement. In one embodiment, the maximum variation in the calcium content or effective calcium content, and/or in a one month period (more preferably a one week period, or even a one day period) is less than 10%, 5%, 4%, 3%, 2%, or 1% by volume, weight, or unit of reactivity.

Modifying the calcium content of a pozzolan fraction by blending two or more different pozzolan sources and/or controlling the calcium content produced in burning a hydrocarbon feed can be important to provide calcium at later stages of cement hydration. Since pozzolan particles hydrate over time, there may be some calcium in the interior of the pozzolan particle that does not hydrate in the first few days of curing but are released as hydration penetrates deeper into the particle. This allows more calcium to be released at latter stages of hydration and can provide better ultimate strength than releasing all of the calcium upon initial wetting of the particles. However, if desired, the use of lime or other sources of base can be used in combination with calcium optimization through blending different pozzolan sources.

The foregoing invention related to controlling variation of the calcium oxide content of one or more pozzolan sources can alternatively be carried out in a similar manner to control the effective aluminate content. That is, the aluminate content may be controlled by blending two or more different pozzolan sources having different effective aluminate contents to achieve a desired aluminate content and/or effective aluminate content and/or reactivity of aluminate. In one embodiment, variation in aluminate can be offset by adding sulfate (e.g., gypsum). The blending of one or more different pozzolans to achieve a desired aluminate content and/or effective aluminate content can be carried out so as to achieve a desired reduction in variability of the pozzolan fraction and/or the blended cement. The foregoing numerical values for the reduction in variability of calcium content can also be achieved for the reduction in variability of the aluminate content, effective aluminate content, and/or reactivity of aluminates in the pozzolan fraction and/or blended cement.

Other chemical constituents that vary over time in pozzolan sources can also be adjusted using the methods described herein. For example, the variation may be content or effective content of sulfate, silicate, and/or carbon. In some embodiments, the undesired variation in the initial pozzolan may be a ratio of two or more chemical constituents. For example the undesired variation over time may be a variation in the ratio of aluminate to silicate, aluminate to tricalicum silicate, aluminate to gypsum, silicate to carbon, calcium to tricalcium and/or dicalcium silicate, and similar chemical relationships that can effect strength development and set times of a concrete composition incorporating the pozzolan fraction and/or blended cement.

In one embodiment, the undesired variation in a chemical characteristic (e.g., calcium content and/or aluminate content and/or sulfate) of an initial pozzolan stream and/or modified pozzolan stream, and/or blended cement is measured using a chemical analyzer as described above with respect to FIG. 2.

As discussed, in some embodiments a modifying chemical reagent such as gypsum or hydration stabilizer may be added the pozzolan fraction and/or blended cement to mitigate undesired variability. These additions can be made by adding the chemical in-line to a stream of the pozzolan fraction and/or blended cement. The chemical reagent can be metered in at the desired concentration based on the measured variation and based on the volume of material in the pozzolan or blended cement stream. In an alternative embodiment, a modifying chemical agent can be added in batch. For a batch addition, the amount of modifying chemical to be added is based on a plurality of measurement for portions of the pozzolan stream and/or blended cement stream that are collected as a batch. The amount of modifying chemical agent will depend on the amount of variation in the various subfractions analyzed and batched.

The methods for mitigating undesired chemical variation can also be carried out by blending two or more different types of cements to obtain a desired chemical composition in a blended cement that has less variation over time as discussed above with regard to blending two or more different pozzolans.

In a preferred embodiment, the amounts and ratios of the different pozzolans, different cements, and/or chemical agents to be added or combined are controlled in part using a computer module running computer executable instructions as described above with respect to FIG. 2. The computer module receives a series of measurements from the chemical analyzer and detects variation in the pozzolan fraction and/or blended cement by comparing the readings to a concentration parameter. The concentration parameter can be a fixed numerical value for a particular chemical constituent (e.g., CaO, sulfate, aluminate, tricalcium silicate, or the like). The computer module can then calculate the ratios and/or amounts of pozzolan, cement, and/or chemical agents to be mixed to achieve a desired concentration, desired effective concentration, and/or desired chemical reactivity based on the deviation of an actual measurement from the concentration parameter.

The control module can manipulate the pozzolan fraction and/or blended cement upstream from the chemical analyzer and/or downstream from the chemical analyzer. If the control module modifies the pozzolan fraction and/or blended cement upstream from the chemical analyzer, the control module can continue making an adjustment until the actual chemical reading by the analyzers shows that the chemical composition is within a desired range of the concentration parameter. Alternatively or in addition, the modification can occur downstream from the control module.

The control module can be configured to operate conveyors, injectors, fans, feed hoppers, comminution equipment, blenders, and the like to achieve the desired modification in the content, effective content, and/or chemical reactivity of a chemical constituent of the pozzolan fraction and/or blended cement, thereby reducing the chemical variability thereof.

While carbon is generally not desirable to add to a cement mix, in some embodiments, carbon can be added to reduce variability in the carbon content of a pozzolan fraction and/or cement fraction. Other methods of reducing the variability of carbon content over time include adding surfactants and or carbon sequestering agents. In a preferred embodiment, the present invention is directed at controlling the variation of one or more chemical constituent with the proviso that the chemical constituent is not carbon.

VII. Cementitious Compositions

The inventive pozzolan cement compositions can be used to make concrete, mortar, grout, molding compositions, or other cementitious compositions. In general, "concrete" refers to cementitious compositions that include a hydraulic cement binder and aggregate, such as fine and coarse aggregates (e.g., sand and rock). "Mortar" typically includes cement, sand and lime and can be sufficiently stiff to support the weight of a brick or concrete block. "Grout" is used to fill in spaces, such as cracks or crevices in concrete structures, spaces between structural objects, and spaces between tiles. "Molding compositions" are used to manufacture molded or cast objects, such as pots, troughs, posts, fountains, ornamental stone, and the like.

Water is both a reactant and rheology modifier that permits fresh concrete, mortar or grout to flow or be molded into a desired configuration. The hydraulic cement binder reacts with water, is what binds the other solid components together, and is responsible for strength development. Cementitious compositions within the scope of the present invention will typically include hydraulic cement (e.g., Portland cement), pozzolan (e.g., fly ash), water, and aggregate (e.g., sand and/or rock). Other components that can be added include water and optional admixtures, including but not limited to accelerating agents, retarding agents, plasticizers, water reducers, water binders, and the like.

It will be appreciated that the inventive pozzolan cement compositions can be manufactured (i.e., blended) prior to incorporation into a cementitious composition or they may be prepared in situ. For example, some or all of the hydraulic cement and pozzolan particles can be mixed together when making a cementitious composition. In the case where supplemental lime is desired in order to increase the speed and/or extent of pozzolan hydration, at least some of the supplemental lime or other base may be added to the cementitious composition directly.

Admixtures typically used with OPC can also be used in the inventive concrete compositions of the invention. Examples of suitable admixtures include, but are not limited to, hydration stabilizers, retarders, accelerantory, and/or water reducers. Additional details regarding cementitious compositions that can be manufactured according to the invention and incorporated into the embodiments disclosed herein can be found in co-pending patent application Ser. No. 12/576,117, filed Oct. 8, 2009, which is hereby incorporated by reference in its entirety.

VIII. Examples

The following examples, when expressed in the past tense, illustrate embodiments of the invention that have actually been prepared. Examples given in the present tense are hypothetical in nature but are nevertheless illustrative of embodiments within the scope of the invention.

Cementitious mortar compositions were prepared according to ASTM C-109 in order to test the strength of mortar cubes made therefrom. The mortar compositions were prepared according to standard procedures established by ASTM C-109, including adding the cement to the water, mixing at slow speed for 30 seconds, adding the sand over a period of 30 seconds while mixing at slow speed, stopping the mixing, scraping the walls, letting the mixture stand for 90 seconds, and then mixing at medium speed for 60 seconds.

The flow of each of the cementitious mortar compositions was tested using a standard flow table, in which a sample of mortar was placed in the middle of the table, the table was subjected to 25 raps, and the diameter of the resulting mass was measured in four directions and added together to give a composite flow value in centimeters.

Thereafter, the mortar was packed into mortar cube molds using standard procedures established by ASTM C-109, including filling the molds half-way, compacting the mortar in the molds using a packing tool, filling the molds to the tops, compacting the mortar using a packing tool, and smoothing off the surface of mortar in the molds.

The mortar cube molds were placed in a standard humidity chamber for 1 day. Thereafter, the mortar cubes were removed from the molds and submerged inside buckets filled with saturated aqueous lime solution. The cubes were thereafter tested for compressive strength using a standard compressive strength press at 3 days, 7 days and 28 days.

Examples 1-4

Examples 1-4 illustrate the effect of particle size optimizing a 70:30 blend of Portland cement and fly ash. The Portland cement used in each of Examples 1-4 was an approximate Type II cement made by grinding Type V cement more finely. Example 1 was a particle size optimized 70:30 cement/pozzolan blend. It employed a classified Portland cement identified as "cement #11", which was obtained by passing approximate Type II Portland cement through a Microsizer Air Classifier manufactured by Progressive Industries, located in Sylacauga, Ala. and collecting the fine fraction. Example 1 also employed classified fly ash identified as "fly ash 8z1", which was obtained by passing Class F fly ash through an air classifier twice, first to remove most of the fines below about 10 μm and second to remove most of the fines above about 50 μm. The air classifier was model CFS 8 HDS of Netzsch-Condux Mahltechnik GmbH, located in Hanau, Germany. Examples 2 and 3 were both 70:30 control blends of Portland cement and fly ash which used unclassified Type II cement ("control cement") and Class F fly ash ("control fly ash"). Example 4 used 100% ordinary Type II Portland cement. The particle size distributions of the Portland cement and fly ash fractions were determined at Netzsch-Condux Mahltechnik GmbH using a Cilas 1064 particle size analyzer and are set forth below in Table 1.

TABLE 1

| | Percent Passing/Cumulative Total (%) | | | |
|---|---|---|---|---|
| Particle Size (μm) | Cement #11 | Control cement | Fly Ash 8z1 | Control fly ash |
| 0.04 | 0.15 | 0.13 | 0.04 | 0.10 |
| 0.10 | 0.84 | 0.81 | 0.09 | 0.51 |
| 0.50 | 5.27 | 5.79 | 0.68 | 3.40 |
| 1.00 | 12.71 | 13.44 | 1.91 | 9.27 |
| 2.00 | 21.97 | 21.21 | 3.36 | 20.74 |
| 3.00 | 28.13 | 24.99 | 3.88 | 28.59 |
| 4.00 | 35.76 | 29.24 | 4.22 | 33.79 |
| 6.00 | 54.90 | 39.23 | 4.69 | 40.87 |
| 8.00 | 73.49 | 48.47 | 4.69 | 46.27 |
| 10.00 | 87.10 | 56.15 | 4.69 | 50.78 |
| 15.00 | 99.13 | 71.34 | 10.04 | 59.32 |
| 20.00 | 100.0 | 83.16 | 24.65 | 65.58 |
| 32.00 | 100.0 | 97.50 | 66.84 | 78.82 |
| 50.00 | 100.0 | 100.0 | 95.53 | 93.78 |
| 71.00 | 100.0 | 100.0 | 100.0 | 99.40 |
| 100.0 | 100.0 | 100.0 | 100.0 | 100.0 |

The compositions used in making mortar cubes according to Examples 1-4 and also the flow and strength results are set forth below in Table 2. The weight of fly ash added to the 70:30 blends was reduced to account for its reduced density compared to the Portland cement in order to maintain 30% volumetric replacement.

TABLE 2

| Component/ | Example | | | |
|---|---|---|---|---|
| strength | 1 | 2 | 3 | 4 |
| Cement #11 | 518 g | — | — | — |
| Fly Ash 8z1 | 162.1 g | — | — | — |
| Control OPC | — | 518 g | 518 g | 740 g |
| Control FA | — | 162.1 g | 162.1 g | — |
| Graded Sand | 2035 g | 2035 g | 2035 g | 2035 g |
| Water | 360 g | 360 g | 330 g | 360 g |
| Flow | 106 | 136+* | 109.5 | 118 |
| 3-day strength | 26.6 MPa | 16.0 MPa | 15.8 MPa | 28.6 MPa |
| 7-day strength | 26.8 MPa | 21.2 MPa | 18.2 MPa | 32.4 MPa |
| 28-day strength | 40.9 MPa | 32.0 MPa | 35.4 MPa | 45.6 MPa |

*Only 21 taps on flow table

Figure 3:
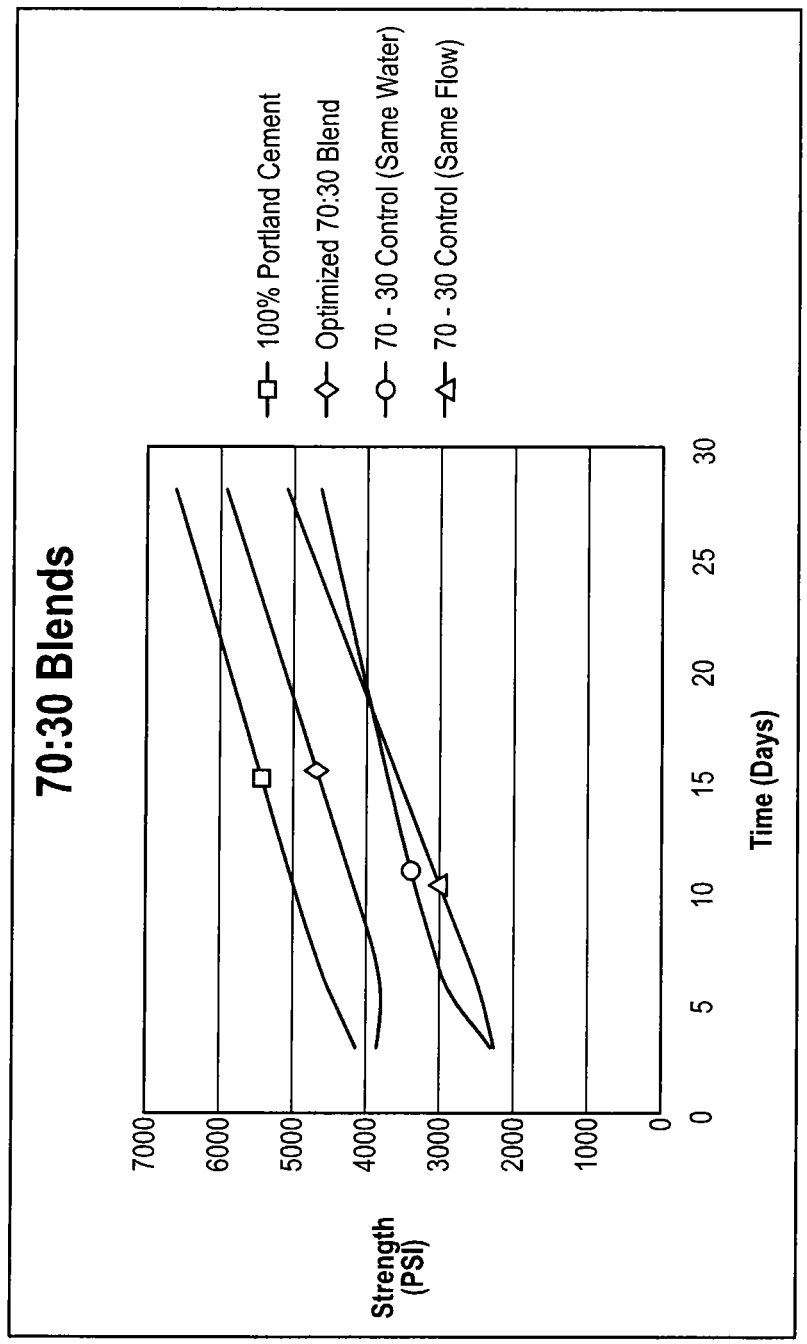
FIG. 3 is a graph comparing a pozzolan cement blend with control blends and 100% Portland cement.

As can be seen from the data in Table 2, the inventive 70:30 blend of Example 1 had 93% of the strength of the 100% OPC composition of Example 4 at 3 days, 83% of the strength at 7 days, and 90% of the strength at 28 days. By comparison, the 70:30 control blends of Examples 2 and 3 only had 56% and 55%, respectively, of the strength of the 100% OPC composition of Example 4 at 3 days, 65% and 56%, respectively, of the strength at 7 days, and 70% and 78% of the strength at 28 days. Particle size optimizing the Portland cement and fly ash fractions yielded substantially greater strength development compared to the control blends at 3, 7 and 28 days. The increase in strength was particularly pronounced at 3 days. FIG. 3 graphically illustrates and compares the strengths obtained using the compositions of Examples 1-4.

Examples 5-14

Other mortar compositions (i.e., 60:40 and 70:30 blends) were manufactured using cement #11 and fly ash 8z1. In addition, mortar compositions were manufactured using another classified cement material identified as "cement #13" and another classified fly ash identified as "fly ash 7G". Cement #13 was classified at the same facility as cement #11. The particle size distributions of cement #11, cement #13 and the control cement were determined at the classifying facility using a Beckman Coulter LS 13 320 X-ray diffraction analyzer and are set forth below in Table 3.

TABLE 3

| Particle Size | Percent Passing/Cumulative Total (%) | | |
|---|---|---|---|
| (μm) | Cement #11 | Cement #13 | Control cement |
| 0.412 | 0.26 | 0.33 | 0.14 |
| 0.545 | 2.33 | 2.96 | 1.24 |
| 0.721 | 6.42 | 8.21 | 3.43 |
| 0.954 | 11.9 | 15.3 | 6.37 |
| 1.261 | 18.1 | 23.5 | 9.66 |
| 1.669 | 24.7 | 32.5 | 13.0 |
| 2.208 | 32.1 | 42.1 | 16.6 |
| 2.920 | 40.9 | 52.7 | 20.5 |
| 3.863 | 51.6 | 64.2 | 25.3 |
| 5.111 | 64.1 | 76.1 | 31.5 |
| 6.761 | 77.4 | 87.3 | 39.4 |
| 8.944 | 89.6 | 96.0 | 49.0 |
| 11.83 | 97.9 | 99.8 | 60.3 |
| 15.65 | 99.97 | 100 | 73.0 |
| 20.71 | 100 | 100 | 85.6 |
| 24.95 | 100 | 100 | 92.4 |
| 30.07 | 100 | 100 | 96.7 |
| 36.24 | 100 | 100 | 98.9 |
| 43.67 | 100 | 100 | 99.8 |
| 52.63 | 100 | 100 | 99.995 |

Fly ash 7G was classified at the same facility as fly ash 8z1 (Netzsch-Condux Mahltechnik GmbH) but was only classified once to remove fine particles. It was not classified a second time to remove coarse particles. The particle size distribution of fly ash 7G was determined using a Cilas 1064 particle size analyzer and is set forth below in Table 4. The PSD of the control fly ash is included for comparison

TABLE 4

| | Percent Passing/Cumulative Total (%) | |
|---|---|---|
| Particle Size (μm) | Fly Ash 7G | Control fly ash |
| 0.04 | 0.00 | 0.10 |
| 0.10 | 0.00 | 0.51 |
| 0.50 | 0.51 | 3.40 |
| 1.00 | 1.34 | 9.27 |
| 2.00 | 2.24 | 20.74 |
| 3.00 | 2.60 | 28.59 |
| 4.00 | 2.80 | 33.79 |
| 6.00 | 2.99 | 40.87 |
| 8.00 | 2.99 | 46.27 |
| 10.00 | 2.99 | 50.78 |
| 15.00 | 5.26 | 59.32 |
| 20.00 | 10.94 | 65.58 |
| 32.00 | 29.26 | 78.82 |
| 50.00 | 54.79 | 93.78 |
| 71.00 | 76.18 | 99.40 |
| 100.0 | 92.01 | 100.0 |
| 150.0 | 99.46 | 100.0 |

The compositions used in making mortar cubes according to Examples 5-14 and also the flow and strength results are set forth below in Tables 5 and 6. The amount of fly ash added to some of the blends was reduced to account for its reduced density compared to the Portland cement in order to maintain a 30% or 40% volumetric replacement. In other cases, the replacement was 30% or 40% by weight. In one example, lye was added; in another, slaked lime.

TABLE 5

| | Example | | | | |
|---|---|---|---|---|---|
| Component/strength | 5 | 6 | 7 | 8 | 9 |
| Cement #11 | 444 g | 518 g | 444 g | 444 g | 444 g |
| Cement #13 | — | — | — | — | — |
| Fly Ash 8z1 | — | — | 216.1 g | — | — |
| Fly Ash 7G | 296 g | 222 g | — | 216.1 g | — |
| Control FA | — | — | — | — | 216.1 g |
| Graded Sand | 2035 g | 2035 g | 2035 g | 2035 g | 2035 g |
| Water | 390 g | 370 g | 360 g | 360 g | 360 g |
| Flow | 109 | 95 | 122 | 110 | 107.5 |
| 3-day | 19.1 MPa | 26.1 MPa | 19.4 MPa | 16.7 MPa | 20.7 MPa |
| 7-day | 21.5 MPa | 33.0 MPa | 26.7 MPa | 25.3 MPa | 21.8 MPa |
| 28-day | 28.2 MPa | 35.5 MPa | 28.2 MPa | 30.3 MPa | 25.9 MPa |

TABLE 6

| | Example | | | | |
|---|---|---|---|---|---|
| Component/strength | 10 | 11 | 12 | 13 | 14 |
| Cement #11 | 444 g | — | 518 g | 444 g | 444 g |
| Cement #13 | — | 444 g | — | — | — |
| Fly Ash 8z1 | 216.1 g | 216.1 g | 162 g | — | — |
| Fly Ash 7G | — | — | — | 216.1 g | 216.1 g |
| Type S Lime | — | — | — | — | 20 g |
| NaOH | — | — | — | 3.3 g | — |
| Graded Sand | 2035 g | 2035 g | 2035 g | 2035 g | 2035 g |

TABLE 6-continued

| Component/strength | Example | | | | |
|---|---|---|---|---|---|
| | 10 | 11 | 12 | 13 | 14 |
| Water | 350 g | 360 g | 360 g | 360 g | 360 g |
| Flow | 106.5 | 110.5 | 86.5 | 89 | 98 |
| 3-day | 19.7 MPa | 18.7 MPa | 19.9 MPa | 17.9 MPa | 17.9 MPa |
| 7-day | 20.9 MPa | 21.9 MPa | 25.9 MPa | 19.1 MPa | 17.6 MPa |
| 28-day | 27.6 MPa | 30.6 MPa | 28.6 MPa | 23.7 MPa | 28.6 MPa |

The following examples are hypothetical examples based on the principals disclosed herein.

Example 15

A high early strength pozzolan cement is manufactured by combining the following components in the amounts specified:

| Component | Amount by Weight | Particle Size Range |
|---|---|---|
| Portland cement | 45% | 0.1-20 μm |
| Pozzolan | 50% | 20-100 μm |
| Calcium hydroxide | 5% | 1-10 μm |

The foregoing composition has early strength that is comparable to OPC and a strength and durability after 1 year that equals or exceeds that of OPC.

Example 16

A high early strength pozzolan cement is manufactured by combining the following components in the amounts specified:

| Component | Amount by Weight | Particle Size Range |
|---|---|---|
| Portland cement | 40% | 0.1-15 μm |
| Pozzolan | 53% | 15-100 μm |
| Calcium hydroxide | 7% | 1-10 μm |

The foregoing composition has early strength that is comparable to OPC and a strength and durability after 1 year that equals or exceeds that of OPC.

Example 17

A high early strength pozzolan cement is manufactured by combining the following components in the amounts specified:

| Component | Amount by Weight | Particle Size Range |
|---|---|---|
| Portland cement | 30% | 0.1-10 μm |
| Pozzolan | 60% | 10-100 μm |
| Calcium hydroxide | 10% | 1-10 μm |

The foregoing composition has early strength that is comparable to OPC and a strength and durability after 1 year that equals or exceeds that of OPC.

Example 18

A high early strength pozzolan cement is manufactured by combining the following components in the amounts specified:

| Component | Amount by Weight | Particle Size Range |
|---|---|---|
| Portland cement | 20% | 0.1-5 μm |
| Pozzolan | 65% | 10-100 μm |
| Calcium hydroxide | 15% | 1-10 μm |

The foregoing composition has early strength that is comparable to OPC and a strength and durability after 1 year that equals or exceeds that of OPC.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for blending different pozzolan streams to form a blended pozzolan for later blending with cement and having at least one chemical characteristic within one or more selected ranges, the method comprising:
    establishing the one or more selected ranges for the at least one chemical characteristic of the blended pozzolan;
    providing a first pozzolan stream having at least one variable chemical characteristic;
    providing a second pozzolan stream that differs from the first pozzolan stream relative to at least one chemical characteristic selected from the group consisting of calcium oxide content, aluminate content, silicate content, ratio of aluminate to silicate, iron content, magnesium content, and sulfate content;
    blending the first pozzolan stream with the second pozzolan stream at a blending ratio so as to produce the blended pozzolan;
    measuring the at least one chemical characteristic of the blended pozzolan in a series of readings and determining whether the at least one chemical characteristic is within the one or selected ranges; and
    upon determining that the at least one measured chemical characteristic is outside the one or more selected ranges, modifying the blending ratio of the first and second pozzolans streams so that the at least one chemical characteristic of the blended pozzolan is restored to within the one or more selected ranges.

2. A method as in claim 1, wherein the at least one chemical characteristic of the blended pozzolan comprises a minimum calcium oxide content of at least 5%.

3. A method as in claim 1, wherein the first pozzolan stream comprises one of class C or class F fly ash according to ASTM C 618-03 and the second pozzolan stream comprises a different one of class F or class C fly ash according to ASTM C 618-03.

4. A method as in claim 1, wherein the first pozzolan stream and the second pozzolan stream differ in calcium oxide content by at least about 5%.

5. A method as in claim 1, further comprising measuring the specific gravity of the blended pozzolan.

6. A method as in claim 1, further comprising blending another component with the first and second pozzolan streams.

7. A method as in claim 1, wherein the at least one chemical characteristic is measured by an X-ray diffraction device or an XRF device.

8. A method for making a blended cement comprising first obtaining the blended pozzolan made according to claim 1 and then blending the blended pozzolan fraction with a ground cement clinker.

9. A method as in claim 1, further comprising monitoring a particle size distribution of the blended pozzolan and modifying the blending ratio to maintain the particle size distribution of the blended pozzolan to within a selected range.

10. A method as in claim 9, wherein monitoring the particle size distribution of the blended pozzolan is performed using a particle size analyzer.

11. A method for blending different fly ashes together to form blended fly ash for later blending with cement and having at least one chemical or physical characteristic within one or more selected ranges, the method comprising:
   providing a first fly ash;
   providing a second fly ash that differs from the first fly ash with respect to at least one chemical or physical characteristic;
   blending the first fly ash with the second fly ash at a blending ratio to produce blended fly ash;
   measuring the at least one chemical or physical characteristic of the blended fly ash in a series of readings and determining whether the at least one chemical or physical characteristic is within the one or more selected ranges; and
   upon determining that the at least one chemical or physical characteristic of the blended fly ash is outside the one or more selected ranges, modifying the blending ratio of the first and second fly ashes so that the at least one chemical or physical characteristic of the blended fly ash is restored to within the one or more selected ranges.

12. A method as in claim 2, wherein the minimum calcium oxide content is at least 10%.

13. A method as in claim 2, wherein the minimum calcium oxide content is at least 15%.

14. A method as in claim 2, wherein the minimum calcium oxide content is at least 20%.

15. A method as in claim 11, wherein the at least one chemical or physical characteristic of the blended fly ash comprises a minimum calcium oxide content is of at least 10%.

16. A method as in claim 15, wherein the minimum calcium oxide content is at least 20%.

17. A method as in claim 11, wherein the at least one chemical or physical characteristic of the blended fly ash comprises particle size distribution.

18. A method as in claim 11, wherein the at least one chemical or physical characteristic of the blended fly ash comprises specific gravity.

19. A method for maintaining the calcium oxide content of a blended pozzolan within an established range prior to blending with cement, comprising:
   blending two or more pozzolans that differ in calcium oxide content to form the blended pozzolan;
   measuring the calcium oxide content of the blended pozzolan and determining whether the calcium oxide content is within the established range; and
   upon determining that the calcium oxide content of the blended pozzolan is outside the established range, modifying a blending ratio of the two or more pozzolans to restore the calcium oxide content of the blended pozzolan to within the established range.

20. A method as in claim 19, wherein at least one of the two or more pozzolans comprises fly ash or natural pozzolan.

* * * * *